US010234869B2

(12) United States Patent
Jimenez Hernandez et al.

(10) Patent No.: US 10,234,869 B2
(45) Date of Patent: Mar. 19, 2019

(54) VEHICLE DESTINATIONS (71) Applicant: Ford Global Technologies, LLC, Dearborn, MI (US)

(72) Inventors: Alvaro Jimenez Hernandez, Miguel Hidalgo (MX); Oswaldo Perez Barrera, Texcoco (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 179 days.

(21) Appl. No.: 15/349,018

(22) Filed: Nov. 11, 2016

(65) Prior Publication Data

US 2018/0136667 A1    May 17, 2018

(51) Int. Cl.
  *G05D 1/02* (2006.01)
  *G01C 21/36* (2006.01)
  *H04W 4/40* (2018.01)
  *H04L 29/08* (2006.01)

(52) U.S. Cl.
  CPC ......... *G05D 1/0287* (2013.01); *G01C 21/362* (2013.01); *H04L 67/12* (2013.01); *H04W 4/40* (2018.02)

(58) Field of Classification Search
  CPC ....... G05D 1/0287; H04W 4/40; H04L 67/12; H04L 12/40; H04L 2012/40215; G01C 21/3605
  See application file for complete search history.

(56) References Cited

U.S. PATENT DOCUMENTS

| 5,557,254 | A | 9/1996 | Johnson et al. |
| 6,252,544 | B1 | 6/2001 | Hoffberg |
| 6,816,090 | B2 | 11/2004 | Teckchandani et al. |
| 9,406,177 | B2 | 8/2016 | Attard et al. |
| 9,932,041 | B2 * | 4/2018 | Kim ........................ G16H 10/65 |
| 9,958,864 | B2 * | 5/2018 | Kentley-Klay ......... G01C 21/26 |
| 9,977,426 | B2 * | 5/2018 | Chen ..................... G05D 1/0027 |
| 2006/0247849 | A1 * | 11/2006 | Mohsini ................. G01C 21/20 701/434 |
| 2015/0219464 | A1 * | 8/2015 | Beaurepaire ....... G01C 21/3438 701/538 |
| 2015/0241880 | A1 * | 8/2015 | Kim ..................... G05D 1/0287 701/25 |
| 2015/0254986 | A1 * | 9/2015 | Fairfield .................. G08G 1/22 707/687 |
| 2015/0271201 | A1 | 9/2015 | Ruvio et al. |
| 2015/0349917 | A1 * | 12/2015 | Skaaksrud ......... G06Q 10/0833 370/328 |

(Continued)

FOREIGN PATENT DOCUMENTS

WO   WO 2016046819 A1   3/2016

*Primary Examiner* — Frederick M Brushaber
(74) *Attorney, Agent, or Firm* — Frank A. MacKenzie; Bejin Bieneman PLC (57) ABSTRACT

A computer is programmed to detect requests for a host vehicle to drive to various destinations. The computer is further programmed to send request notifications of the requests to the user devices of an owner of the host vehicle and, under certain conditions, a user of the host vehicle. The computer is further programmed to receive communications from the user devices confirming or denying the request notifications, and to instruct the host vehicle to drive or to not drive to requested destinations based on the received communications.

20 Claims, 3 Drawing Sheets

(56) References Cited

U.S. PATENT DOCUMENTS

| | | | |
|---|---|---|---|
| 2016/0171637 A1* | 6/2016 | Rai | H04L 67/12 |
| | | | 705/13 |
| 2016/0247094 A1* | 8/2016 | Scicluna | G06Q 50/30 |
| 2016/0247109 A1* | 8/2016 | Scicluna | G06Q 10/06315 |
| 2016/0247247 A1* | 8/2016 | Scicluna | G06F 17/3087 |
| 2016/0277513 A1* | 9/2016 | Kim | H04L 67/18 |
| 2017/0262301 A1* | 9/2017 | Bai | G06F 9/4411 |
| 2017/0316533 A1* | 11/2017 | Goldman-Shenhar | |
| | | | G06Q 50/30 |
| 2017/0334441 A1* | 11/2017 | Sen | B60W 10/20 |

* cited by examiner

VEHICLE DESTINATIONS

BACKGROUND

An autonomous vehicle, i.e., a self-driving vehicle, operates according to instructions from a computer. Thus, the autonomous vehicle may travel to a destination with or without occupants. In addition, the autonomous vehicle can be shared among multiple users, e.g., as part of a car sharing fleet or public transport system. However, the autonomous vehicle may lack an operator to make decisions about control, and to control, the vehicle.

DETAILED DESCRIPTION

Introduction

A computer 110 of a host vehicle 100 is programmed to detect requests for the host vehicle 100 to drive to various destinations, including requests from user devices 135. The computer 110 is further programmed to send notifications of the requests to the user devices 135 of an owner of the host vehicle 100 and, under certain conditions, users of the host vehicle 100. The computer 110 is further programmed to receive communications from the user devices 135 confirming or denying the request notifications, and to instruct the host vehicle 100 to drive or to not drive to requested destinations based on the received communications.

For purposes of this disclosure, the terms "host vehicle owner," "user," and "occupant" may refer to the same person, or to different persons.

Figure 1:
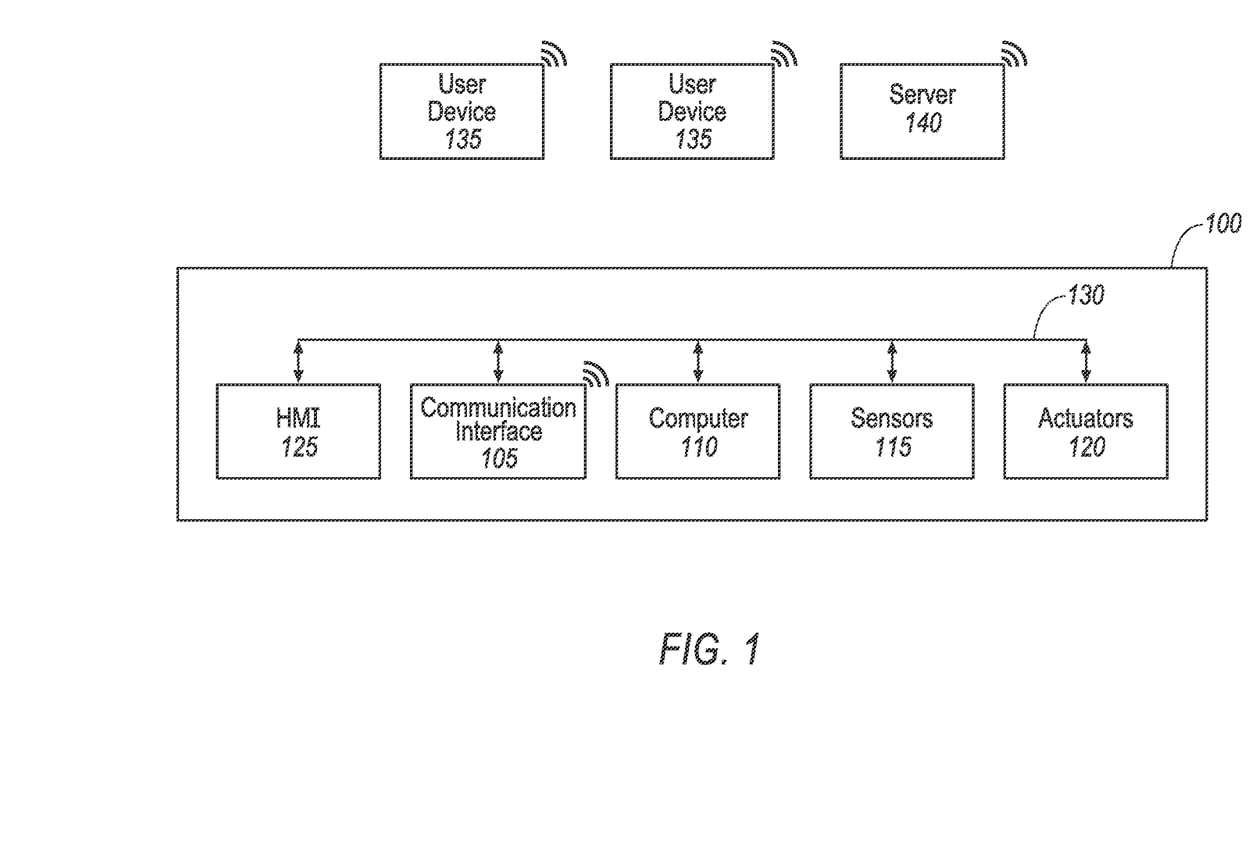
FIG. 1 is block diagram of an example host vehicle including a computer.

FIG. 1 is a block diagram of the host vehicle 100. The host vehicle 100 includes a communication interface 105, a computer 110, sensors 115, actuators 120, and a human machine interface (HMI) 125, in communication with each other over a vehicle communication network 130, each of which is discussed in more detail below.

System Elements

The host vehicle 100 may be powered in variety of known ways, e.g., with an electric motor and/or internal combustion engine. The host vehicle 100 includes the communication interface 105, the computer 110, sensors 115, actuators 120, the HMI 125, the vehicle communication network 130, and other components discussed below.

The computer 110 includes a processor and a memory such as are known. The memory includes one or more forms of computer-readable media, and stores instructions executable by the computer 110 for performing various operations, including those disclosed herein.

The computer 110 may operate the host vehicle 100 in an autonomous or semi-autonomous mode. For purposes of this disclosure, an autonomous mode is one in which the computer 110 controls propulsion (e.g., via a powertrain including an electric motor and/or an internal combustion engine), braking, and steering of the host vehicle 100. In a semi-autonomous mode, the computer 110 controls one or two of the propulsion, braking, and steering of the host vehicle 100.

The computer 110 may include programming to operate one or more of the propulsion (e.g., control of acceleration in the vehicle by controlling one or more of an internal combustion engine, electric motor, hybrid engine, etc.), braking, and steering of the host vehicle 100. The computer 110 may be further programmed to operate climate control, interior and/or exterior lights, etc., as well as to determine whether and when the computer 110, as opposed to a human operator, is to control such operations.

The computer 110 is generally arranged for communications on the vehicle communication network 130, e.g., including a communication bus such as a controller area network (CAN), Ethernet, Local Interconnect Network (LIN) or the like. The computer 110 may include or be communicatively coupled to, e.g., via the vehicle communications network 130, more than one processor, e.g., controllers or the like included in the vehicle for monitoring and/or controlling various subsystems such as a powertrain, brake, steering, etc.

Via the vehicle communication network 130, the computer 110 may transmit data to and/or receive data from various components in the host vehicle 100, e.g., controllers, the communication interface 105, sensors 115, actuators 120, the HMI 125, etc. Alternatively or additionally, in cases where the computer 110 comprises multiple devices, the vehicle communication network 130 may be used for communications between devices represented as the computer 110 in this disclosure. Further, as mentioned below, various controllers and/or sensors 115 may provide data to the computer 110 via the vehicle communication network 130.

The communication interface 105 includes an antenna, circuits, chips, or other electronic components that can communicate with various electronic devices through a wired or a wireless communication link. The computer 110 may be configured for communicating through the communication interface 105. For example, the communication interface 105 may be programmed to facilitate wireless communications between the computer 110 of the host vehicle 100 and the user devices 135. Thus, communications, e.g., messages, received from the user devices 135, may be forwarded to the computer 110, and communications, e.g., notifications, from the computer 110 can be forwarded to the user devices 135.

The communication interface 105 may be programmed to communicate in accordance with any number of wireless communication protocols such as Bluetooth®, Bluetooth® Low Energy, WiFi, or any cellular or satellite-based communication protocol. Moreover, the communication interface 105 may be programmed to communicate over the vehicle communication network 130 via CAN, Ethernet, LIN, or other wired communication protocols.

As discussed above, generally included in instructions stored in the memory and executed by the computer 110 is programming for operating one or more vehicle components, e.g., braking, steering, propulsion, etc., without intervention of a human operator. Using data received in the computer 110, e.g., data from sensors 115, etc., the computer 110 may make various determinations and/or control various vehicle components and/or operations without a driver to operate the vehicle.

For example, the computer 110 may include programming to regulate vehicle operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location, intersection (without signal) minimum time-to-arrival to cross the intersection, etc.

Sensors 115 can include a variety of devices known to provide data via the vehicle communication network 130, or via other suitable interfaces such as are known. For example, the sensors 115 may include one or more cameras, radars, and/or Light Detection and Ranging (LIDAR) sensors disposed in the host vehicle 100 providing data encompassing at least some of the vehicle exterior. The data may be received by the computer 110 via, e.g., the vehicle communication network 130.

The sensors 115 can include a GPS (global positioning system) device. The GPS sensor may transmit current geographical coordinates of the host vehicle 100 via the vehicle communication network 130.

The actuators 120 include circuits, chips, or other electronic components that can actuate various vehicle subsystems in accordance with appropriate control signals as is known. For instance, the actuators 120 may include one or more relays, servomotors, etc. The actuators 120 may therefore be used to control braking, acceleration, and steering of the host vehicle 100. The control signals used to control the actuators 120 may be generated by the computer 110, or a control unit located in the host vehicle 100, e.g., the brake controller, etc.

The HMI 125 can include a touch screen, an interactive voice response (IVR) system, and/or other input/output mechanisms such as are known, and can receive input data from an occupant of the host vehicle 100 and/or output data to the occupant. For example, the HMI 125 may have a soft key or a push button to initiate movement of the host vehicle 100.

The user devices 135 may be of any variety of computing devices that include a processor and a memory, such as a personal computer (e.g., a laptop computer, a desktop computer, a tablet, etc.), a smartphone, a personal digital assistant, etc., including wearable devices such as smart watches.

The user devices 135 can communicate with other electronic devices, including, e.g., the computer 110 of the host vehicle 100 via the communication interface 105, as discussed above. The user devices 135 may transmit certain identifiers that are unique to each user device 135. For example, the identifiers may include a MAC Address, an International Mobile Equipment Identifier (IMEI), an Electronic Serial Number (ESN), a Mobile Equipment Identifier (MEID), a Mobile Directory Number (MDN), a Mobile Identification Number (MIN), a Mobile Subscription Identification Number (MSIN), an International Mobile Subscriber Identification number (IMSI), a static or dynamic IP address, an email address, and the like.

The user devices 135 may communicate with the communication interface 105, the server 140, or both, via Bluetooth®, Bluetooth® Low Energy, WiFi, or any cellular or satellite-based communication protocol.

The computer 110 may be programmed to associate one or more user devices 135 with the host vehicle owner. For example, identifiers associated with the user devices 135 of the host vehicle owner can be stored in the memory of the computer 110. In this way, when the user devices 135 having identifiers associated with the host vehicle owner communicate with the computer 110, the computer 110 can associate those communications, e.g., messages, with the host vehicle owner. In addition, the computer 110 can be programmed to transmit communications, e.g., notifications, to the user devices 135 associated with the host vehicle owner.

Alternatively or additionally, the computer 110 may be programmed to associate a password, e.g., a personal identification number (PIN) with the host vehicle owner. For example, the computer 110 can be programmed to receive a password communicated from any user device 135. If the received password matches the password the computer 110 is programmed to associate with the host vehicle owner, e.g., a stored password, the computer 110 can be programmed to at least temporarily associate communications from that user device 135 with the host vehicle owner.

The computer 110 may also be programmed to associate one or more user devices 135 with users of the host vehicle 100. For example, a user may request via a user device 135 that the host vehicle 100 drive to a pick-up destination (e.g., a location of the user) and a drop-off destination (e.g., where the user would like to be driven by the host vehicle 100). The computer 110 may be programmed to associate one or more identifiers associated with that user device 135 with that user, and store the identifiers associated with that user in the memory of the computer 110. In this way, the computer 110 can associate communications, e.g., messages, from that user device 135 with that user. Moreover, the computer 110 can be programmed to transmit communications, e.g., request notifications, to the user device 135 associated with that user.

The server 140 is an electronic computing device that includes circuits, chips, or other electronic components that can store data, such as identifiers associated with user devices 135 of the host vehicle owner, passwords associated with the host vehicle owner, identifiers associated with user devices 135 of users, etc. The server 140 may make such data available to certain electronic devices in response to queries transmitted from those devices. The server 140 may communicate with the computer 110 via the communication interface 105.

Exemplary Processss Flow

Figure 2A:
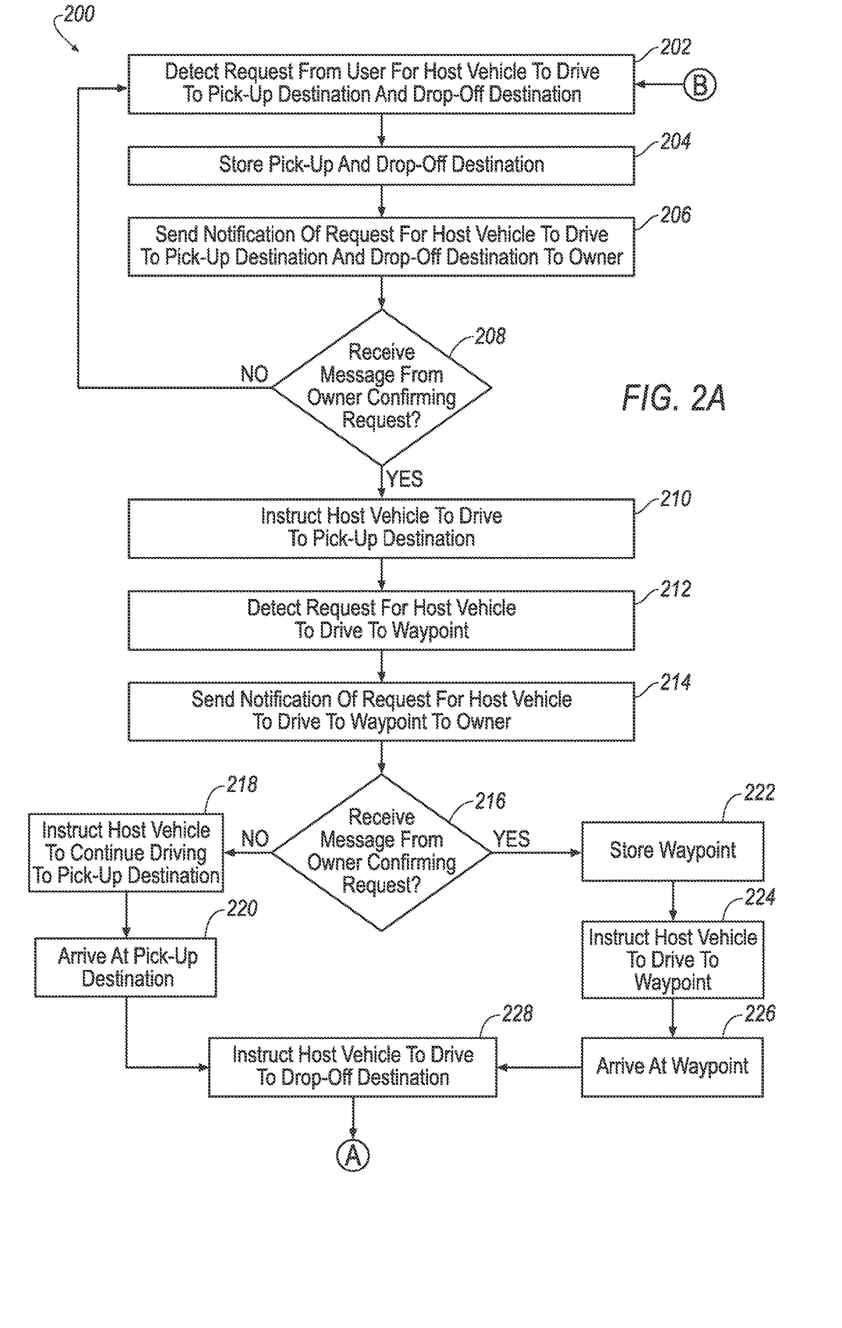
FIGS. 2A and 2B are a flowchart of an example process for the computer.
Figure 2B:
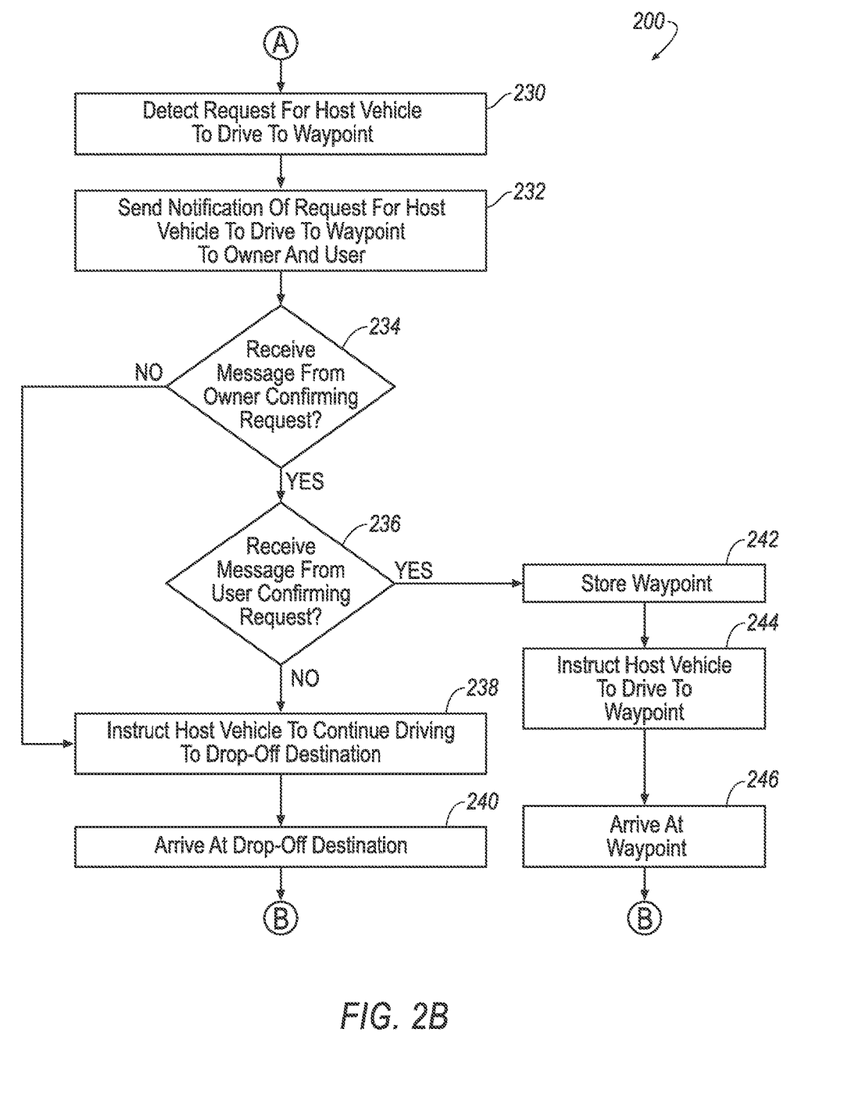

FIGS. 2A and 2B illustrate an example process 200 that may be executed by the computer 110 of the host vehicle 100 to drive the host vehicle 100 to various destinations in accordance with request notifications and confirmations of the requests communicated to the computer 110 by user devices 135 associated with the host vehicle owner and, under certain conditions, with users of the host vehicle 100.

The process begins in a block 202. At the block 202, the computer 110 detects a request from a user via a user device 135 for the host vehicle 100 to drive to a pick-up destination and to a drop-off destination. The pick-up destination may be a current location of the user. The drop-off destination may be a location to which the user would like to be driven by the host vehicle 100 after the host vehicle 100 picks up the user. As discussed above, the computer 110 may be programmed to associate one or more identifiers associated with the user's user device 135 with the user, and at least temporarily store the identifiers associated with the user in the memory of the computer 110 and/or the server 140. Following the block 202, the process 200 proceeds to a block 204.

Alternatively, the user may initially request the host vehicle 100 drive to the pick-up destination via the user device 135. Subsequently, e.g., upon the arrival of the host vehicle 100 at the pick-up destination, the user may request the host vehicle 100 to drive to the drop-off destination via the user device 135.

In the block 204, the computer 110 is programmed to store the pick-up destination and the drop-off destination. For example, the pick-up and drop-off destinations can be stored in the memory of the computer 110 and/or on the server 140. Following the block 204, the process 200 proceeds to a block 206.

In the block 206, the computer 110 is programmed to send a request notification for the host vehicle 100 to drive to the pick-up destination and the drop-off destination to a user device 135 associated with the host vehicle owner. The request notification can include information regarding, e.g., locations of the pick-up and the drop-off destinations; routes the host vehicle 100 may travel to drive to the pick-up and the drop-off destinations; whether the host vehicle currently has occupants; whether the request is from a user that has previously used the host vehicle 100; etc. Following the block 206, the process 200 proceeds to a decision block 208.

In the decision block 208, the computer 110 is programmed to determine whether a communication, e.g., message, from a user device 135 associated with the host vehicle owner has been received confirming or denying the request notification that the user has requested the host vehicle 100 to drive to the pick-up destination and the drop-off destination. If the computer 110 determines a communication has been received from the user device 135 associated with the host vehicle owner confirming the request notification, the process 200 proceeds to a block 210. If the computer 110 determines a communication has been received from the user device 135 associated with the host vehicle owner denying the request notification, the process 200 returns to the block 202.

Alternatively or additionally, the computer 110 may be programmed to wait a predetermined amount of time for a communication from the user device 135 associated with the host vehicle owner confirming or denying the request notification. If the predetermined amount of time has passed without receiving the communication, the computer 110 may be programmed to confirm or deny the request notification without further authorization, and the process 200 will proceed to the block 210, or return to the block 202, accordingly.

In the block 210, the computer 110 instructs the host vehicle 100 to drive to the pick-up destination. As discussed above, before proceeding to the block 210, the computer 110 has determined that the request by the user for the host vehicle 100 to drive to the pick-up and drop-off destinations has been confirmed. The confirmation may be a result of the computer 110 receiving a communication from the user device 135 associated with the host vehicle owner confirming the request, from the passing of a predetermined amount of time without receiving a communication from the user device 135 associated with the host vehicle owner denying the request, or both. From the block 210, the process 200 proceeds to a block 212.

In the block 212, the computer 110 is programmed to detect a request for the host vehicle 100 to drive to a waypoint, a location different from the pick-up destination, while driving to the pick-up destination. For example, the user may request, e.g., via the user device 135, that the host vehicle 100 drive to the waypoint rather than the pick-up destination. Or, another person may request that the host vehicle 100 drive to the waypoint via a user device 135 or otherwise. From the block 212, the process 200 proceeds to a block 214.

In the block 214, the computer 110 is programmed to send a request notification of the request for the host vehicle 100 to drive to the waypoint to the user device 135 associated with the host vehicle owner. The request notification can include information regarding, e.g., a location of the waypoint; routes the host vehicle 100 may travel to drive to the waypoint; whether the host vehicle currently has occupants; whether the request is from the user that requested the host vehicle 100 drive to the pick-up location and the drop-off location; whether the request is from a user that has previously used the host vehicle 100; etc. Following the block 214, the process 200 proceeds to a decision block 216.

In the decision block 216, the computer 110 is programmed to determine whether a communication, e.g., message, from a user device 135 associated with the host vehicle owner has been received confirming or denying the request notification for the host vehicle 100 to drive to the waypoint. If the computer 110 determines a communication has been received from the user device 135 associated with the host vehicle owner denying the request notification, the process 200 proceeds to a block 218. If the computer 110 determines a communication has been received from the user device 135 associated with the host vehicle owner confirming the request notification, the process 200 proceeds to a block 222.

Alternatively or additionally, the computer 110 may be programmed to wait a predetermined amount of time for a communication from the user device 135 associated with the host vehicle owner confirming or denying the request notification. If the predetermined amount of time has passed without receiving the communication, the computer 110 may be programmed to confirm or deny the request without further authorization, and the process 200 will proceed to the block 218, or proceed to the block 222, accordingly.

In the block 218, the computer 110 instructs the host vehicle 100 to drive to the pick-up destination. Before proceeding to the block 218, the computer 110 has determined that the request notification for the host vehicle 100 to drive to the waypoint has been denied. The denial may be a result of the computer 110 receiving a communication from the user device 135 associated with the host vehicle owner denying the request notification, from the passing of a predetermined amount of time without receiving a communication from the user device 135 associated with the host vehicle owner confirming the request notification, or both. From the block 218, the process 200 proceeds to a block 220.

In the block 220, the host vehicle 100 arrives at the pick-up destination. The pick-up destination may be, e.g., the location of the user. Thus, the user may enter the host vehicle 100. As discussed above, the user's initial request may have included the request that the host vehicle 100 drive to the pick-up destination and to the drop-off destination. As such, the computer 110 already stored the drop-off destination in the block 204 prior to the user entering the host vehicle 100 at the pick-up destination. From the block 220, the process 200 proceeds to a block 228.

Referring back to the decision block 216 and as discussed above, the computer 110 is programmed to determine whether a communication, e.g., message, from the user device 135 associated with the host vehicle owner has been received confirming or denying the request notification that the host vehicle 100 drive to the waypoint. If the computer 110 determines a communication has been received from the user device 135 associated with the host vehicle owner denying the request notification, the process 200 proceeds to a block 218. If the computer 110 determines a communication has been received from the user device 135 associated with the host vehicle owner confirming the request notification, the process 200 proceeds to a block 222.

In the block 222, the computer 110 is programmed to store the waypoint. For example, the waypoint can be stored in the memory of the computer 110 and/or on the server 140. Following the block 222, the process 200 proceeds to a block 224.

In the block 224, the computer 110 instructs the host vehicle 100 to drive to the waypoint. Before proceeding to the block 224, the computer 110 has determined that the request notification for the host vehicle 100 to drive to the waypoint has been confirmed. The confirmation may be a result of the computer 110 receiving a communication from the user device 135 associated with the host vehicle owner confirming the request notification, from the passing of a predetermined amount of time without receiving a communication from the user device 135 associated with the host vehicle owner denying the request notification, or both. From the block 224, the process 200 proceeds to a block 226.

In the block 226, the host vehicle 100 arrives at the waypoint. The waypoint may be, e.g., the current location of the user. As discussed above, the user may have requested, e.g., via the user device 135, that the host vehicle 100 drive to the waypoint rather than the pick-up destination while the host vehicle 100 was driving to the pick-up destination. Thus, the user may enter the host vehicle 100 upon the arrival of the host vehicle 100 at the waypoint. As also discussed above, the user's request may have also included the request that the host vehicle 100 drive to the drop-off destination. As such, the computer 110 may have already stored the drop-off destination in the block 204 prior to the user entering the host vehicle 100 at the waypoint. From the block 226, the process 200 proceeds to the block 228.

At the block 228, the computer 110 instructs the host vehicle 100 to drive to the drop-off destination. As discussed above, before proceeding to the block 228, the computer 110 has determined that the request by the user for the host vehicle 100 to drive to the drop-off destination has been confirmed. The confirmation may be a result of the computer 110 receiving a communication from the user device 135 associated with the host vehicle owner confirming the request notification, from the passing of a predetermined amount of time without receiving a communication from the user device 135 associated with the host vehicle owner denying the request notification, or both. From the block 228, the process 200 proceeds to a block 230.

In the block 230, the computer 110 is programmed to detect a request for the host vehicle 100 to drive to a waypoint, a location different from the drop-off destination, while driving to the drop-off destination. For example, the user may request, e.g., via the user device 135, that the host vehicle 100 drive to the waypoint rather than the drop-off destination. Or, another person may request that the host vehicle 100 drive to the waypoint via a user device 135 or otherwise. From the block 230, the process 200 proceeds to a block 232.

In the block 232, the computer 110 is programmed to send a request notification of the request for the host vehicle 100 to drive to the waypoint to the user device 135 associated with the host vehicle owner, and to the user device 135 associated with the user. The request notifications can include information regarding, e.g., a location of the waypoint; routes the host vehicle 100 may travel to drive to the waypoint; whether the host vehicle currently has occupants; whether the request is from the user that requested the host vehicle 100 drive to the first location and the second location; whether the request is from a user that has previously used the host vehicle 100; etc. Following the block 232, the process 200 proceeds to a decision block 234.

In the decision block 234, the computer 110 is programmed to determine whether a communication, e.g., message, from a user device 135 associated with the host vehicle owner has been received confirming or denying the request notification for the host vehicle 100 to drive to the waypoint. If the computer 110 determines a communication has been received from the user device 135 associated with the host vehicle owner denying the request notification, the process 200 proceeds to a block 238.

In the block 238, the computer 110 instructs the host vehicle 100 to drive to the drop-off destination. Before proceeding to the block 238, the computer 110 has determined that the request notification for the host vehicle 100 to drive to the waypoint has been denied. The denial may be a result of the computer 110 receiving a communication from the user device 135 associated with the host vehicle owner denying the request notification, from the passing of a predetermined amount of time without receiving a communication from the user device 135 associated with the host vehicle owner confirming the request notification, or both. From the block 238, the process 200 proceeds to a block 240.

In the block 240, the host vehicle 100 arrives at the drop-off destination. The drop-off destination may be, e.g., a location where the user wanted to be driven by the host vehicle 100. In the block 240, the user may exit the host vehicle 100. From the block 240, the process 200 may end, or return to the block 202.

Referring back to the decision block 234, as discussed above, the computer 110 is programmed to determine whether a communication, e.g., message, from a user device 135 associated with the host vehicle owner has been received confirming or denying the request notification for the host vehicle 100 to drive to the waypoint. If the computer 110 determines a communication has been received from the user device 135 associated with the host vehicle owner confirming the request notification, the process 200 proceeds to a decision block 236.

In the decision block 236, the computer 110 is programmed to determine whether a communication, e.g., message, from a user device 135 associated with the user has been received confirming or denying the request notification for the host vehicle 100 to drive to the waypoint. If the computer 110 determines a communication has been received from the user device 135 associated with the user denying the request notification, the process 200 proceeds to the block 238 and to the block 240, as discussed above. Alternatively, if the computer 110 determines that a communication has been received from the user device 135 associated with the user confirming the request notification, the process 200 proceeds to a block 242.

In the block 242, the computer 110 is programmed to store the waypoint. For example, the waypoint can be stored in the memory of the computer 110 and/or on the server 140. Following the block 242, the process 200 proceeds to a block 244.

In the block 244, the computer 110 instructs the host vehicle 100 to drive to the waypoint. Following the block 244, the process 200 proceeds to a block 246.

In the block 246, the host vehicle 100 arrives at the waypoint. From the block 246, the process 200 may end, or return to the block 202.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A computer comprising a processor and a memory, the memory storing instructions executable by the processor such that the computer comprises programming to:
   detect a request from a first user device in a host vehicle to drive to a first waypoint different from a pick-up destination to which a host vehicle is driving;
   then send a request notification to a second user device remote from the vehicle; and
   then control the host vehicle to continue driving to the pick-up destination if a message is received from the second user device denying the request.

2. The computer of claim 1, wherein the computer is further programmed to:
   control the host vehicle to drive to the first waypoint if a message is received from the second user device confirming the request.

3. The computer of claim 1, wherein the computer is further programmed to:
   control the host vehicle to continue driving to the pick-up destination if no message is received from the second user device in a predetermined time.

4. The computer of claim 1, wherein the computer is further programmed to:
   control the host vehicle to drive to the first waypoint if no message is received from the second user device in a predetermined time.

5. The computer of claim 1, wherein the computer is further programmed to:
   detect a second request for the host vehicle to drive to the pick-up destination;
   send a second request notification to the second user device; and
   control the host vehicle to drive to the pick-up destination if a message is received from the second user device confirming the second request.

6. The computer of claim 5, wherein the computer is further programmed to:
   control the host vehicle to not drive to the pick-up destination if a message is received from the second user device denying the second request.

7. The computer of claim 5, wherein the computer is further programmed to:
   control the host vehicle to drive to the pick-up destination if no message is received from the second user device in a predetermined time.

8. The computer of claim 5, wherein the computer is further programmed to:
   control the host vehicle to not drive to the pick-up destination if no message is received from the second user device in a predetermined time.

9. The computer of claim 1, wherein the computer is further programmed to:
   detect a request for the host vehicle to drive to a drop-off destination;
   send a second request notification to the second user device of the host vehicle owner; and
   control the host vehicle to drive to the drop-off destination if a message is received from the second user device confirming the second request.

10. The computer of claim 9, wherein the computer is further programmed to:
    control the host vehicle to not drive to the drop-off destination if a message is received from the second user device denying the second request.

11. The computer of claim 9, wherein the computer is further programmed to:
    control the host vehicle to drive to the drop-off destination if no message is received from the second user device in a predetermined time.

12. The computer of claim 9, wherein the computer is further programmed to:
    control the host vehicle to not drive to the drop-off destination if no message is received from the second user device in a predetermined time.

13. The computer of claim 9, wherein the computer is further programmed to:
    detect a request for the host vehicle to drive to a second waypoint while driving to the drop-off destination;
    send a request notification to the second user device of a host vehicle owner and to a user device of a user; and
    control the host vehicle to continue driving to the drop-off destination if one of a message is received from the second user device denying the request, and no message is received from the second user device in a predetermined time.

14. The computer of claim 13, wherein the computer is further programmed to:

control the host vehicle to continue driving to the drop-off destination if a message is received from the second user device denying the request notification.

15. The computer of claim 13, wherein the computer is further programmed to:

control the host vehicle to drive to the second waypoint if messages are received from the first and second user devices confirming the request notifications.

16. The computer of claim 13, wherein the computer is further programmed to:

control the host vehicle to drive to the second waypoint if a message is received from the first user device confirming the request notification, and one of a message is received from the second user device confirming the request notification and no message is received from the second user device in a predetermined time.

17. A method comprising:

detecting a request from a first user device in a host vehicle to drive to a first waypoint different from a pick-up destination to which a host vehicle is driving;

then sending a request notification to a second user device remote from the vehicle; and then controlling the host vehicle to continue driving to the pick-up destination if a message is received from the second user device denying the request.

18. The method of claim 17, further comprising:

controlling the host vehicle to drive to the second destination if a message is received from the user device confirming the request notification.

19. The method of claim 17, further comprising:

controlling the host vehicle to continue driving to the first destination if no message is received from the user device in a predetermined time.

20. The method of claim 17, further comprising:

controlling the host vehicle to drive to the second destination if no message is received from the user device in a predetermined time.

\* \* \* \* \*